United States Patent
Hussary et al.

(10) Patent No.: US 6,297,466 B1
(45) Date of Patent: Oct. 2, 2001

(54) METHOD FOR REPAIRING STEEL SPRAY-FORMED TOOLING WITH TIG WELDING PROCESS

(75) Inventors: Nakhleh Hussary, Minneapolis, MN (US); Paul Earl Pergande, Beverly Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/415,974

(22) Filed: Oct. 12, 1999

(51) Int. Cl.$^7$ .................................................. B23K 10/00
(52) U.S. Cl. .................. 219/76.16; 219/121.47; 219/121.59; 219/76.15; 228/119; 29/402.18
(58) Field of Search .................. 219/121.59, 121.45, 219/121.46, 76.14, 76.15, 76.16, 77; 228/33, 119, 135; 29/402.18, 402.01

(56) References Cited

U.S. PATENT DOCUMENTS

| | | | |
|---|---|---|---|
| 4,897,519 | * | 1/1990 | Clark et al. .................. 219/76.14 |
| 5,348,212 | * | 9/1994 | Galanes .................. 228/135 |
| 5,793,009 | * | 8/1998 | Offer .................. 219/75 |
| 5,932,293 | * | 8/1999 | Belashchenko et al. .................. 427/446 |

* cited by examiner

Primary Examiner—Mark Paschall
(74) Attorney, Agent, or Firm—Damian Porcari; William J. Coughlin

(57) ABSTRACT

A machine tool or die that is fabricated from thermally spray-formed steel is repaired on the factory floor by first cleaning the area to be repaired to removed all dirt and impurities. Next the surface is prepared by means of preheating the surface with propane torches at a rate not exceeding 50° Centigrade per hour to boil off the moisture in the tool. The weldment is formed by the TIG welding process and then finished by conventional machining, grinding and polishing.

14 Claims, 1 Drawing Sheet

METHOD FOR REPAIRING STEEL SPRAY-FORMED TOOLING WITH TIG WELDING PROCESS

CROSS REFERENCE TO RELATED INVENTION

Co-pending application entitled "Method For Repairing Spray-Formed Steel Tooling" by Hussary et al. having Ser. No. 09/415,973 pending is commonly filed herewith and assigned to the same assignee.

FIELD OF THE INVENTION

This invention relates in general to spray-formed steel tooling produced by thermal spraying processes and more particularly to a method for repairing such spray-formed steel tooling by TIG welding process.

BACKGROUND OF THE INVENTION

Spray-formed steel tooling is fabricated by first creating a pattern of the desired tool using a free form fabrication technique. The pattern is then used to create a ceramic mold that is the inverse of the tool to be produced. The resulting ceramic mold is the receptor into which metal is sprayed to form a deposit in the shape of the desired tool.

At least one spray forming process is wire-arc spraying. In wire-arc spraying, electric current is carried by two electrically conductive, consumable wires with an electric arc forming between the wire tips. A high-velocity gas jet blowing from behind the moving wires strips away the molten metal that continuously forms as the wires are melted by the electric arc. The high-velocity gas jet breaks up or atomizes the molten metal into finer particles in order to create a fine distribution of molten metal droplets. The atomizing gas then accelerates the particles away from the electrode tips to the substrate surface where the molten particles impact the substrate to incrementally form a deposit in the shape of the tool.

The spraying process results in a fine microstructure that produces improved strength, toughness and ductility over metals that are produced by typical casting methods. Regulating the temperature of the deposit controls residual stresses. Thus, geometric accuracy and low residual stresses in the as-deposited tool are achieved.

The completed tool is backed up with an aluminum epoxy backfill material. The completed tool is then mounted and used to produce parts just like any other stamping, die casting, or molding process. There is concern about fatigue life because the porosity of the tool produced is five percent or more, but preliminary estimates of the fatigue life of these parts under load is 10,000 or more cycles which is acceptable for prototype tool applications.

Spray-forming of steel is used for rapid production of prototype and production steel tooling at considerable cost savings over the conventional production by machining and heat treatment of steel tooling for such applications as injection molding and stamping. Typically small sets of prototype permanent tooling can take from four to five months to fabricate, while large prototype tooling can take up to one year to fabricate. Spray-formed steel tooling has been produced in one month at costs substantially less than for permanent tooling.

Such spray-formed steel prototype tooling however has a limited lifetime than its conventional machined steel counterpart, due, in part to the more granular nature of the thermally-sprayed steel, and generally lower overall strength of the sprayed material. Thus, spray-formed steel tooling may be expected to incur a greater need for repair during its useful lifetime and subsequent extension of lifetime through advanced surface repair processes. Typical tool repair involves arc welding new material on the tool, then machining and polishing the material to match the tool. However, the non-homogeneous nature of thermal spray-formed steel does not allow for the practice of common welding techniques used on tool steel.

SUMMARY OF THE INVENTION

It is a principle advantage of the present invention to repair spray-formed steel tooling economically by the use of TIG welding processes.

The method of the present invention overcomes the above deficiencies and allows for repairing thermal spray-form steel tooling such as die pieces on the factory floor to reduce the downtime of the tooling. The method comprises the steps of initially cleaning the repair area of the spray-form tool of any dirt or impurities. Then the cleaned surface is prepared by slowly preheating for a predetermined time to a predetermined temperature to boil off the moisture in the tool and reduce the thermal shock of the welding process. Then the clean and prepared surface receives a weldment on the repair area by means of an electric welding process.

BRIEF DESCRIPTION OF THE DRAWING

These and other advantages may be found in the detailed description taken in conjunction with the following drawing in which the sole FIGURE is a flow chart for the method of repairing spray-formed steel.

DETAILED DESCRIPTION OF THE PREFERRED EMBODIMENT

Figure 1:
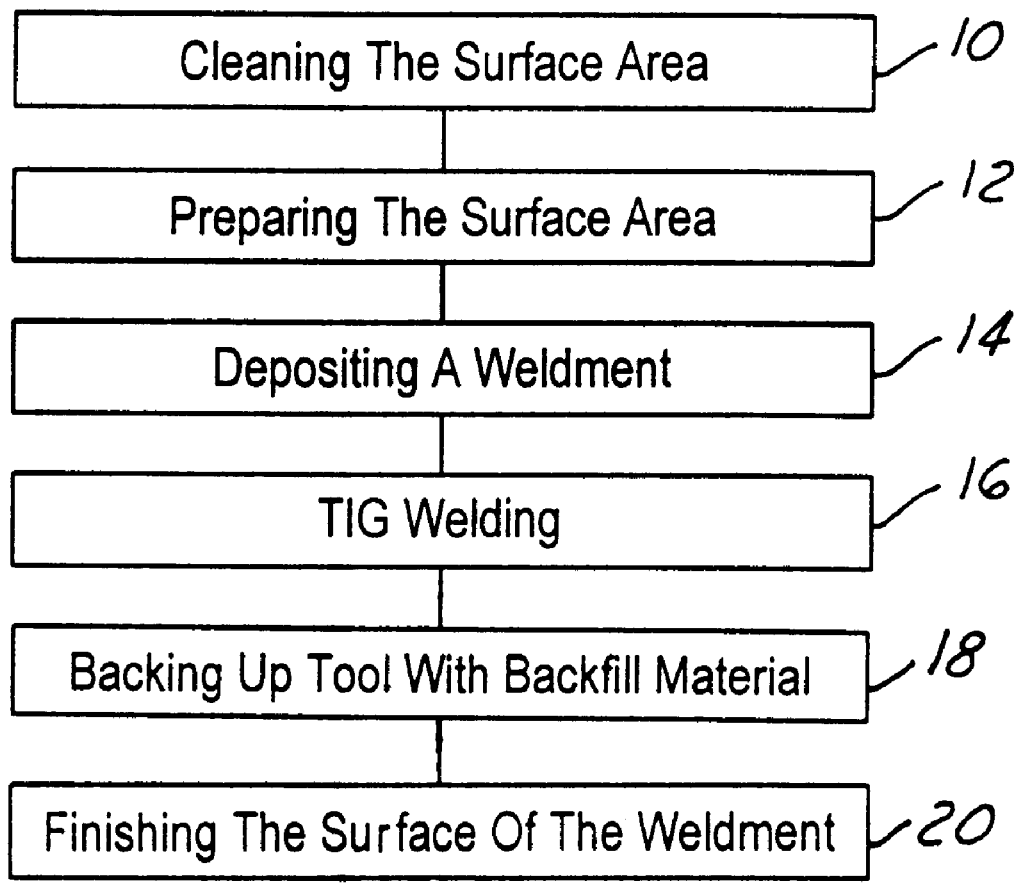

The method of the present invention for repairing thermal spray-form steel tooling such as die pieces allows the repair to be completed on the factory floor. Other processes such as that in the co-pending patent application entitled "Method for Repairing Spray-Formed Steel Tooling" by Hussary et al. require the tool or die to be removed to an area where cold-spray steel is formed on the surface to be repaired. This patent application is incorporated herein by reference.

In this process, a skilled TIG welder is generally used. Other than the co-pending patent application, which is not prior art, there is nothing in the prior art teaching repair of thermal sprayed steel. Conventional weld repair procedures often cause cracking on the substrate.

The welder first cleans 10 the repair area of the spray-form steel tool of any dirt or impurities. Such dirt and impurities include mold release materials.

The repair area is then prepared 12 by slowly preheating the area for a predetermined time to a predetermined temperature to boil off the moisture in the tool and reduce the thermal shock of the welding process. This step may be by means of slowly and uniformly moving a propane torch over the area at a temperature rate not exceeding 50 degrees centigrade per hour. The predetermined temperature is approximately 200° centigrade. Higher temperatures may also work, but aluminum epoxy backfill material begins to degrade over 200° centigrade. Other backfill materials may be developed that would be able to withstand higher preheat temperatures. These materials in turn would allow higher preheating which would enhance the robustness of the repair and allow for greater energy input to the tool.

After the repair area is prepared, a weldment is then deposited 14 on the repair area by means of an electric welding process such as Tungsten Inert Gas, TIG, welding 16. TIG welding should be carried out with straight DC polarity and an Argon shielding gas. The power range for the TIG welding process is between 50 to 70 amperes at thirty volts D.C.

The completed tool is backed up 18 with an aluminum epoxy backfill material. The backfill material is used to fill the space between the spray-formed steel tool and the tool mounting plate in the stamping or molding press. The backfill material is much easier to machine than the steel spray material and is also lower cost.

TIG welding is used due to the fact that arc welding concentrates a relatively large amount of energy in a small area very quickly. Higher power settings tend to overheat the weld puddle and put in more energy than can be carried away without causing too much stress due to the Coefficient of Thermal Expansion, "CTE". Higher power settings tend to cause cracks in the substrate under the weld material. Lower power settings also work well, but take a longer time to complete.

Another technique that works well is to apply a 'bond coat' of weld material at a low power to minimize porosity related defects. Once the 'bond coat' is applied, the TIG welder can weld at a faster rate with higher power settings. The 'bond coat' technique works well when larger areas have to built up with weld material.

The TIG process uses a filler rod of low carbon steel or in the alternative a nickel filler rod that is at least 93% pure can be used. A 99% pure nickel rod is the filler rod of choice.

After the weld is formed, peening the weld while it is red hot helps relieve residual stress in the weld and the surrounding area as the weld cools. Since peening is an operator dependent variable, in the preferred embodiment, peening was not used as it is too easy to damage the tool.

After the weldment is completed, it is finished 20 to the desired surface by conventional machining, grinding and polishing. The tool or die is then put back into service.

There has thus been described a welding process for repairing steel spray-formed tooling by means of the TIG welding process. This process can be performed on the factory floor and the amount of machine down time is held to a minimum.

What is claimed is:

1. The method for repairing thermal spray-form steel tooling such as die pieces comprises the steps of:
   cleaning the repair area of the spray-form tool of any dirt or impurities;
   preparing the repair area by slowly preheating for a predetermined time to a predetermined temperature to boil off the moisture in the tool and to reduce the thermal shock of the welding process; and then
   depositing a weldment on the repair area by means of depositing a weld bead by Tungsten Inert-Gas, TIG, welding.

2. The method of claim 1 wherein the step of preparing the repair area is by means of slowly and uniformly moving a propane torch over the area at a temperature rate not exceeding 50 degrees centigrade per hour.

3. The method of claim 2 wherein the step of preparing the repair area of the spray-form tool to the predetermined temperature, said predetermined temperature is approximately 200 degrees centigrade.

4. The method of claim 3 wherein the predetermined temperature of the spray-form tool is in the range of 180 to 200 degrees centigrade.

5. The method of claim 1 wherein the TIG welding process uses a straight DC polarity with a shielding gas of argon.

6. The method of claim 5 wherein the TIG welding process current range is between 50 to 70 amperes with the voltage approximately 30 volts D.C.

7. The method of claim 1 wherein the TIG welding process utilizes a filler rod of low carbon steel.

8. The method of claim 1 wherein the TIG welding process utilizes a nickel filler rod that is at least 99% pure.

9. The method of claim 1 wherein the step of preparing the repair area is by means of preheating the repair area in an oven at a temperature rate not exceeding 50 degrees centigrade per hour.

10. The method of claim 9 wherein the step of preparing the repair area of the steel spray-form tool to the predetermined temperature is approximately 200 degrees centigrade.

11. The method of claim 10 wherein the predetermined temperature of the steel spray-form tool is in the range of 180 to 200 degrees centigrade.

12. The method of claim 1 additionally including the step of backing up the tool with backfill material filling the space between the tool and the tool mounting plate.

13. The method of claim 12 wherein the backfill material is aluminum epoxy.

14. The method of claim 1 additionally including the step of finishing the surface of the weldment.

* * * * *